United States Patent
Mai et al.

(10) Patent No.: US 10,237,367 B2
(45) Date of Patent: Mar. 19, 2019

(54) METHOD, DEVICE AND STORAGE MEDIA FOR ADDING A FRIEND IN A SOCIAL NETWORK

(71) Applicant: Tencent Technology (Shenzhen) Company Limited, Shenzhen (CN)

(72) Inventors: Junming Mai, Shenzhen (CN); Yuhuang Li, Shenzhen (CN); Yuewen Liu, Shenzhen (CN); Peng He, Shenzhen (CN); Chuan Chen, Shenzhen (CN); Weihua Chen, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 546 days.

(21) Appl. No.: 14/245,605

(22) Filed: Apr. 4, 2014

(65) Prior Publication Data
US 2014/0222925 A1 Aug. 7, 2014

Related U.S. Application Data

(63) Continuation of application No. PCT/CN2013/075534, filed on May 13, 2013.

(30) Foreign Application Priority Data

May 15, 2012 (CN) .......................... 2012 1 0150071

(51) Int. Cl.
*G06F 15/16* (2006.01)
*H04L 29/08* (2006.01)
*H04L 12/58* (2006.01)

(52) U.S. Cl.
CPC ............ *H04L 67/306* (2013.01); *H04L 51/18* (2013.01); *H04L 51/32* (2013.01)

(58) Field of Classification Search
CPC .............................. H04L 67/306; H04L 51/18
(Continued)

(56) References Cited

U.S. PATENT DOCUMENTS

2004/0137882 A1* 7/2004 Forsyth ............... H04L 12/1822
455/414.1
2010/0057858 A1* 3/2010 Shen ....................... H04W 4/21
709/206
(Continued)

FOREIGN PATENT DOCUMENTS

CN 101047522 A 10/2007
CN 101175051 A 5/2008
(Continued)

OTHER PUBLICATIONS

Extended European Search Report and Written Opinion for parallel European Patent Application No. 13790519.6, dated Mar. 18, 2015 (Official Copy only).
(Continued)

*Primary Examiner* — Dustin Nguyen
*Assistant Examiner* — Joel Mesa
(74) *Attorney, Agent, or Firm* — Morgan, Lewis & Bockius LLP

(57) ABSTRACT

The current application describes adding a friend in a social network. A friend adding request corresponding to a first user identification is obtained. Further, a second user identification is obtained according to the friend adding request. The invention then obtains a group that includes the first user identification and the second user identification. A verification request is generated according to information corresponding to the first user identification and sent to a terminal
(Continued)

corresponding to the second user identification. After a friend adding confirmation request corresponding to the second user identification is obtained, the second user identification is added to a friend list corresponding to the first user identification. The current application also describes a device and a storage medium for adding a friend in a social network. The invention of the current application improves the operation convenience of adding a friend.

18 Claims, 3 Drawing Sheets

(58) Field of Classification Search
USPC .......................................................... 709/204
See application file for complete search history.

(56) References Cited

U.S. PATENT DOCUMENTS

| | | |
|---|---|---|
| 2011/0208814 A1 | 8/2011 | Bostrom et al. |
| 2012/0023165 A1 | 1/2012 | Li |

FOREIGN PATENT DOCUMENTS

| | | |
|---|---|---|
| CN | 101193073 A | 6/2008 |
| CN | 101217504 A | 7/2008 |
| CN | 101222446 A | 7/2008 |
| CN | 101237426 A | 8/2008 |
| CN | 102355534 A | 2/2012 |
| JP | 2008107867 A | 5/2008 |
| JP | 2008210304 A | 9/2008 |
| JP | 2009123084 A | 6/2009 |

OTHER PUBLICATIONS

Office Action (Notice of Grounds for Rejection) for parallel Japanese Patent Application No. 2014-531100, dated Mar. 31, 2015 (Official Copy only).
Office Action for parallel Korean Patent Application No. 10-2014-7004102, dated Mar. 23, 2015 (Official Copy only).
Search Report and first Office Action for Priority Chinese Patent Application No. 201210150071.0, dated Jan. 5, 2015 (Official Copy only).
International Search Report and Written Opinion for Application No. PCT/CN2013/075534 dated May 13, 2013.
Tencent Technology, IPRP, PCT/CN2013/075534, dated Nov. 18, 2014, 16 pgs.

* cited by examiner

METHOD, DEVICE AND STORAGE MEDIA FOR ADDING A FRIEND IN A SOCIAL NETWORK

CROSS REFERENCE TO RELATED APPLICATION

The present application is a continuation application of an International Application No. PCT/CN2013/075534, filed May 13, 2013, entitled "METHOD, DEVICE AND STORAGE MEDIA FOR ADDING A FRIEND IN SOCIAL NETWORK" by Junming Mai, Yuhuang Li, Yuewen Liu, Peng He, Chuan Chen, and Weihua Chen, which claims priority from the Chinese patent application No. CN201210150071.0, filed May 15, 2012, entitled "METHOD, DEVICE AND STORAGE MEDIA FOR ADDING A FRIEND IN SOCIAL NETWORK" by Junming Mai, Yuhuang Li, Yuewen Liu, Peng He, Chuan Chen, and Weihua Chen, the disclosures of which are incorporated in their entireties herein by reference.

FIELD OF TECHNOLOGY

The present disclosure relates to social network field, and more particularly to a method, a device and storage media for adding a friend in social network.

BACKGROUND OF THE INVENTION

Social network refers to social network service (SNS). In a social network, a further association can be generated between users via friend relationship, and information transmission between friends is richer and more direct. Multiple users can form a relationship circle (i.e. a collection of multiple users, such as circles, groups, a collection of persons who may be known by each other). The user can broadcast the information he/she published to the relationship circle, and generate an association with other users via the relationship circle.

In a conventional social network, when the user adds a friend, he needs to manually enter verification information and notify the other side, only until the other side confirms, friend adding can be successful completed. For example, in one scene, the user A wants to add the user B as a friend, he needs to find the user B via a user identification of the user B, and then send a request for adding user B as a friend by entering verification information.

It can be seen from the above that, in conventional technique, the method for adding a friend in a social network needs the user to manually enter text messages several times, and the operation is very complicated, so that the operation convenience for the user is poor and the response efficiency of the system is very low.

BRIEF SUMMARY OF THE INVENTION

In view of the above, it is necessary to provide a method for adding a friend in a social network with improved operation convenience for the user.

According to an aspect of the present disclosure, a method for adding a friend in social network includes:

obtaining a friend adding request from a first user identification, and obtaining a second user identification according to the friend adding request;

obtaining a group that includes the first user identification and the second user identification, generating a verification request according to information corresponding to the first user identification, and then sending the verification request to a terminal corresponding to the second user identification; and adding the second user identification to a friend list of the first user identification after obtaining a friend adding confirmation request from the second user identification.

In addition, according to another aspect of the present disclosure, a device is described for adding a friend in social network with improved operation convenience for the user.

A device for adding a friend in social network includes:

an adding request obtaining module configured to obtain a friend adding request from a first user identification, and obtain a second user identification according to the friend adding request;

a verification request generating module configured to obtain a group that includes the first user identification and the second user identification, generate a verification request according to information corresponding to the first user identification, and then send the verification request to a terminal corresponding to the second user identification; and a friend list adding module configured to add the second user identification to a friend list of the first user identification after obtaining a friend adding confirmation request from the second user identification.

The method, device, and storage media for adding a friend in a social network obtain a group where the first user identification and the second user identification are included, and generate a verification request according to information corresponding to the first user identification, and then sends the verification request to a terminal corresponding to the second user identification. The user does not need to manually enter the verification information to generate the verification request, which reduces a step of manually entering text. Therefore, the user only needs to click on a mouse several times to complete adding a friend, thereby improving operation convenience during adding a friend and improving response efficacy of the system.

DETAILED DESCRIPTION

Figure 1:
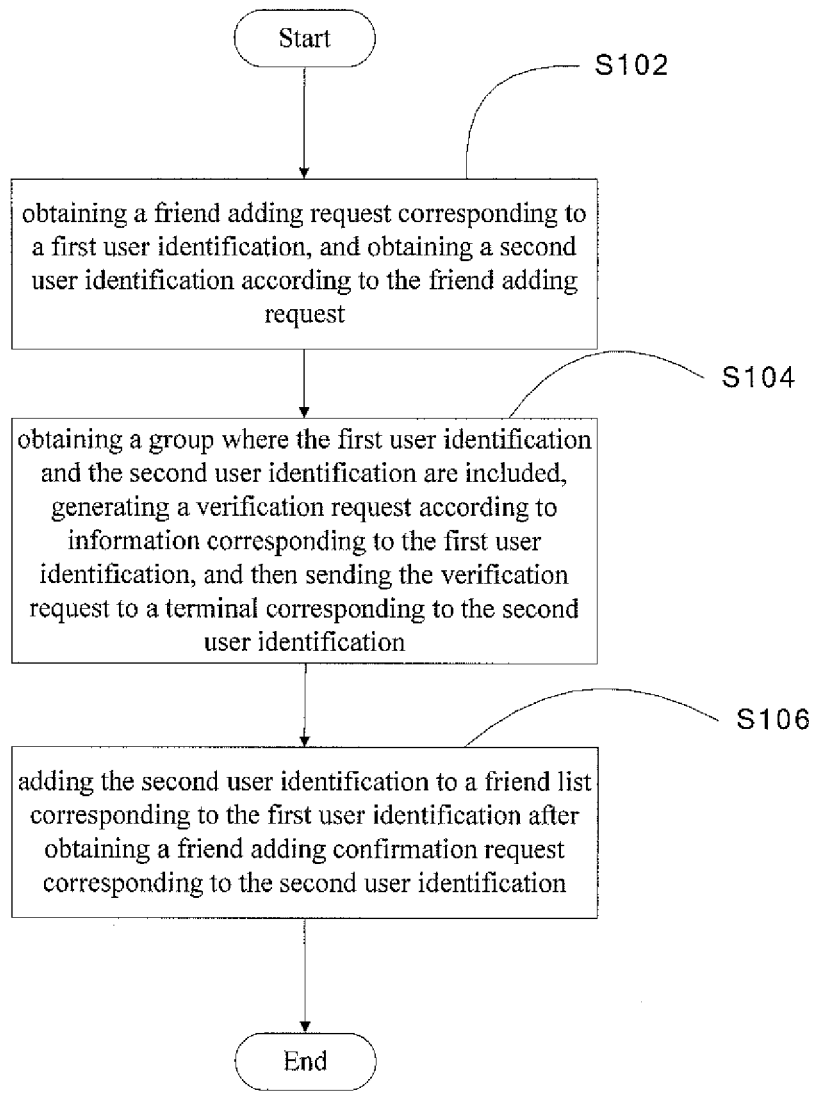
FIG. 1 is a flowchart illustrating a method for adding a friend in social network according to one embodiment.

In one embodiment, as illustrated in FIG. 1, a method for adding a friend in social network includes following steps:

Step S102, obtaining a friend adding request corresponding to a first user identification, and obtaining a second user identification according to the friend adding request.

The first user identification is a user identification corresponding to the user who initiates a friend adding request. The second user identification is a user identification of a user that the first user wishes to add as a friend. A user corresponding to the first user identification is the first user, and a user corresponding to the second user identification is the second user.

In one embodiment, a plurality of recommendation users may be showed in advance to the first user. The recommendation users are users who are associated with the first user in a social network, and whose identifications and the first user identification are in the same group. The recommendation users may be a friend of the first user's friend, a schoolmate, or colleague. The recommendation users may be shown as icons, and a friend adding request is generated in accordance with a clicking operation on an icon.

In this embodiment, the displayed icon can correspond to the user identification of the recommendation user, and the friend adding request can include the second user identification. In another embodiment, the friend adding request may include key words, and the second user identification corresponding to the key words can be searched in a database according to the key words. The key words may be selected from the group consisting of age, gender, residence, name, etc.

Step S104, obtaining a group where the first user identification and the second user identification are included, generating a verification request according to information corresponding to the first user identification, and then sending the verification request to a terminal corresponding to the second user identification.

In one embodiment, the information corresponding to the first user identification includes a user name corresponding to the first user identification. In this embodiment, the information corresponding to the first user identification can be obtained by at least one of the methods selected from:

obtaining the information corresponding to the first user identification according to first remark information corresponding to the first user identification, wherein the first remark information is set by the user in the group; obtaining the information corresponding to the first user identification according to user data corresponding to the first user identification; obtaining the information corresponding to the first user identification according to group card information of the first user corresponding to the first user identification in the group.

A user (a person who adds remarks) may add remark information to another user (a person who has added remarks), and establish a mapping relationship between the remark information, the user identification corresponding to the person who adds remarks, and the user identification corresponding to the person who has added remarks, to facilitate searching. Each person who adds remarks may add different remark information to the person who has added remarks. The remark information may be personalized description such as a pet name, a nickname, a real name, etc. The user in the group may be other users except for the first user and the second user. In this embodiment, the first remark information corresponding to the first user identification is the remark information which is set by other users in the group.

The user data corresponding to the first user identification may include one or more selected from the group consisting of a pet name, gender, a real name, a graduating school, a birth place name, location and company where the user is employed, which are pre-set by the user.

The group card information of the first user corresponding to the first user identification in the group is a group card set by the first user in the group. The group card information may include one or more selected from a group nickname, gender, a real name, graduating school, birth place, location, and company.

Furthermore, in one embodiment, the obtained first remark information is multiple, and the first remark information may be filtered, and the filtered first remark information is remark information of the same content and with the largest count number.

For example, a user A belongs to group 1, group 1 includes a user A, a user B, a user C, a user D and a user E, and the user B, C, and D are friends of the user A. Wherein, in the friend list of the user B and the user C, the remark information of the user A is stored as "patton," and in the friend list of the user D, the remark information of the user A is stored as "pig." Then, when the user A adds the user E as a friend, the automatically generated verification information is "hi, I am patton," which is then presented to the user A through an editable input box, and then a verification request is generated according to the verification information.

In one embodiment, the step of generating a verification request according to the information corresponding to the first user identification includes: determining whether the first remark information corresponding to the first user identification is obtained, if yes, generating the verification information according to the first remark information; otherwise generating the verification information according to user data corresponding to the first user identification.

In another embodiment, the step of generating the verification request according to the information corresponding to the first user identification includes: generating the verification information according to the information corresponding to the first user identification, and returning the verification request to a terminal corresponding to the first user identification; obtaining a select request for verification information; generating the verification request according to the select request for verification information.

The generated verification information may be multiple. After returning the verification information to the terminal corresponding to the first user identification, the terminal may present the multiple verification information through an editable drop-down box. The user may select the verification information through the editable drop-down box and generate corresponding select request for verification information and upload the same.

In this embodiment, multiple verification information may be generated automatically for the user and the user is prompted to select the most appropriate verification information. The verification request is generated according to the selected verification information.

Step S106, after obtaining a friend adding confirmation request from the second user identification, adding the second user identification to a friend list of the first user identification.

After the verification request is sent to the second user, the second user is informed by email, instant message, or other communication means, and a request prompt box is presented to the second user, then the friend adding confirmation request is generated by obtaining clicking operation on the request prompt box by the second user.

In one embodiment, the friend list may be an array or link list, and the friend list may be used to store the user identification of the other users with friend relationship. The friend list corresponding to the first user identification is stored corresponding to the first user identification, and the second user identification may be added into the array or the link list.

In other embodiments, the friend list may be a logical data structure stored in the database. The second user identification is added into the friend list corresponding to the first user identification by creating a corresponding relationship between the second user identification and the first user identification in the database.

In one embodiment, before the second user is added into the friend list of the first user, a second remark information of the second user identification may be obtained, and the second remark information is set by the users in the group.

Furthermore, the obtained second remark information may be multiple, and the second remark information may be filtered, and after being filtered, the second remark information is remark information of the same content and with the largest count number.

After the friend adding confirmation request corresponding to the second user identification is obtained, the first user is informed by email or instant message, and the second remark information is sent to a terminal corresponding to the first identification. The terminal may present an adding success prompt box to the first user, and the second remark information may be presented through the editable input box. After a confirmation instruction is obtained, the second remark information is stored.

In another embodiment, the terminal corresponding to the first user identification may present a plurality of the second remark information simultaneously via the editable drop-down box. The input remark information may be obtained and stored by drop-down selection operation or keyboard input operation.

In this embodiment, an interface can be provided for the user for setting the remark information himself. The user may select appropriate remark information in the second remark information; if the user is not satisfied with the automatically generated second remark information, he/she may input the remark information by himself/herself, facilitating the user's operation.

In one embodiment, the step of adding the second user identification to the friend list corresponding to the first user identification includes: obtaining subgroup information of the user identification in the group in the friend list corresponding to the first user identification; adding the second user identification to a corresponding subgroup in the friend list corresponding to the first user identification according to the subgroup information.

In a social network, in order to facilitate the user to manage friends, subgroups are created in the friend list. For example, a classmate subgroup, a colleague subgroup, a travel enthusiast subgroup, etc. The user can classify his friends into a corresponding subgroup to facilitate searching.

In one embodiment, the step of adding the second user identification to a corresponding subgroup in the friend list corresponding to the first user identification includes: extracting a subgroup containing the largest number of user identifications in the group from the subgroup information, adding the second user identification to the subgroup.

For example, if the majority of the user identification of group friends is in a "classmate" subgroup in the friend list corresponding to the first user identification, then the second user identification will be added into the "classmate" subgroup.

Figure 2:
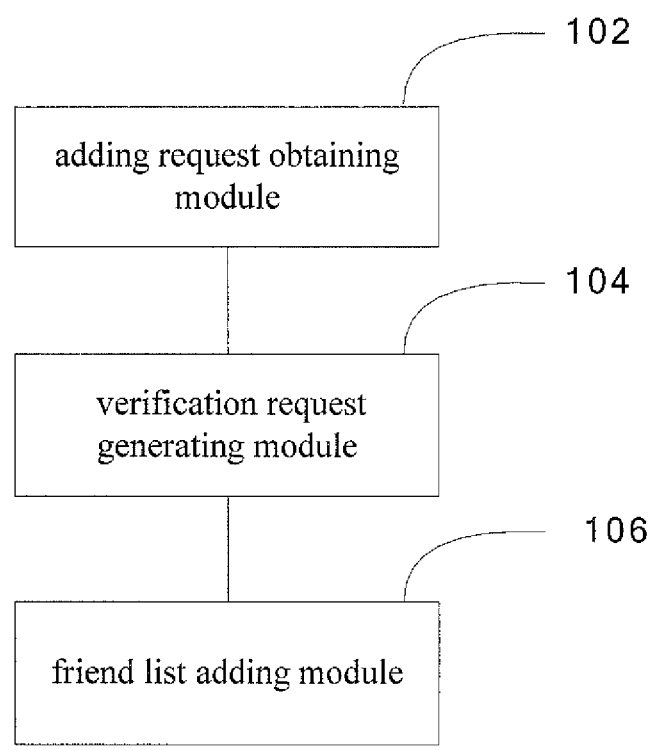
FIG. 2 is a schematic diagram illustrating a structure of a device for adding a friend in social network according to one embodiment.

In one embodiment, as illustrated in FIG. 2, a device for adding a friend in social network, includes: an adding request obtaining module 102, a verification request generating module 104, a friend list adding module 106, wherein:

The adding request obtaining module 102 is configured to obtain a friend adding request corresponding to a first user identification, and obtain a second user identification according to the friend adding request.

The first user identification is a user identification corresponding to the user who initiates a friend adding request. The second user identification is the user identification corresponding to a user who is wished to be added as a friend by the first user. A user corresponding to the first user identification is the first user, and a user corresponding to the second user identification is the second user.

The verification request generating module 104 is configured to obtain a group where the first user identification and the second user identification are included, and generate a verification request according to information corresponding to the first user identification, and then send the verification request to a terminal corresponding to the second user identification.

The friend list adding module 106 is configured to add the second user identification to a friend list of the first user identification after obtaining a friend adding confirmation request from the second user identification.

In one embodiment, a plurality of recommendation users may be showed in advance to the first user. The recommendation users are users who are associated with the first user in the social network, and whose identifications and the first user identification are in the same group. The recommendation users may be a friend of the first user's friend, a schoolmate, or colleague of the first user. The recommendation users may be showed as icons, and the friend adding request is generated via clicking operation on the icons.

In this embodiment, the icons can correspond to the user identification of the recommendation user, and the friend adding request can include the second user identification. In another embodiment, the friend adding request may include key words, and the adding request obtaining module 102 may be configured to search the second user identification corresponding to the key words in a database according to the key words. The key words may be at least one selected from a group of age, gender, residence, name, etc.

In one embodiment, the information corresponding to the first user identification includes a user name corresponding to the first user identification. In this embodiment, the verification request generating module 104 may be configured to obtain the information corresponding to the first user identification by at least one selected from the following methods:

obtaining the information corresponding to the first user identification according to first remark information corresponding to the first user identification, wherein the first remark information is set by the user in the group; obtaining the information corresponding to the first user identification according to user data corresponding to the first user identification; obtaining the information corresponding to the first user identification according to group card information of the first user corresponding to the first user identification in the group.

The user (a person who adds remarks) may add the remark information to another user (a person who has added remarks), and establish a mapping relationship between the remark information, the user identification corresponding to the person who adds remarks, and the user identification corresponding to the person who has added remarks, to facilitate searching. Each person who adds remarks may add different remark information to the person who has added remarks. The remark information may be a personalized description, such as a pet name, a nickname, a real name, etc. The user in the group may be other users except for the first user and the second user. In this embodiment, the first remark information corresponding to the first user identification is the remark information which is set by other users in the group.

The user data corresponding to the first user identification may include one or more selected from a pet name, a real name, graduating school, birth place, location, and company, which is pre-set by the user.

The group card information of the first user corresponding to the first user identification in the group is a group card set by the first user in the group. The group card information may include one or more selected from a group nickname, gender, a real name, graduating school, birth place, location, and company.

Furthermore, in one embodiment, the first remark information obtained is multiple, the verification request generating module 104 may be configured to filter the first remark information, and the filtered first remark information is remark information of the same content and with the largest count number.

For example, a user A belongs to group 1, group 1 includes a user A, a user B, a user C, a user D and a user E, and the user B, C, and D are friends of the user A. Wherein, in the friend list of the user B and the user C, the remark information of the user A is stored as "patton," and in the friend list of the user D, the remark information of the user A is stored as "pig." Then, when the user A adds the user E as a friend, the automatically generated verification information is "hi, I am patton," which is then presented to the user A through an editable input box, and then a verification request is generated according to the verification information.

In one embodiment, the verification request generating module 104 may be further configured to determine whether the first remark information corresponding to the first user identification is obtained. If yes, generate the verification information according to the first remark information; otherwise, generate the verification information according to user data corresponding to the first user identification.

In another embodiment, the verification request generating module 104 may be configured to generate the verification information according to the information corresponding to the first user identification, and return the verification request to a terminal corresponding to the first user identification; select verification information; generate the verification request according to the selected verification information.

The generated verification information may be multiple. After returning the verification information to the terminal corresponding to the first user identification, the terminal may present the multiple verification information through an editable drop-down box. The user may select the verification information through the editable drop-down box, and generate corresponding selected verification information and upload the same.

In this embodiment, multiple verification information may be generated automatically for the user, the user is prompted to select the most appropriate verification information, and the verification request is generated according to the verification information.

After the verification request is sent to the second user, the second user is informed by email, instant message, or various other communication means, a request prompt box is presented to the second user, and then the friend adding confirmation request is generated by obtaining a clicking operation on the request prompt box by the second user.

In one embodiment, the friend list may be an array or link list, and the friend list may be used to store the user identification of the other users with friend relationship. The friend list corresponding to the first user identification is stored corresponding to the first user identification, and the second user identification may be added into the array or the link list.

In other embodiments, the friend list may be a logical data structure stored in the database. The second user identification is added into the friend list corresponding to the first user identification by creating a corresponding relationship between the second user identification and the first user identification in the database.

Figure 3:
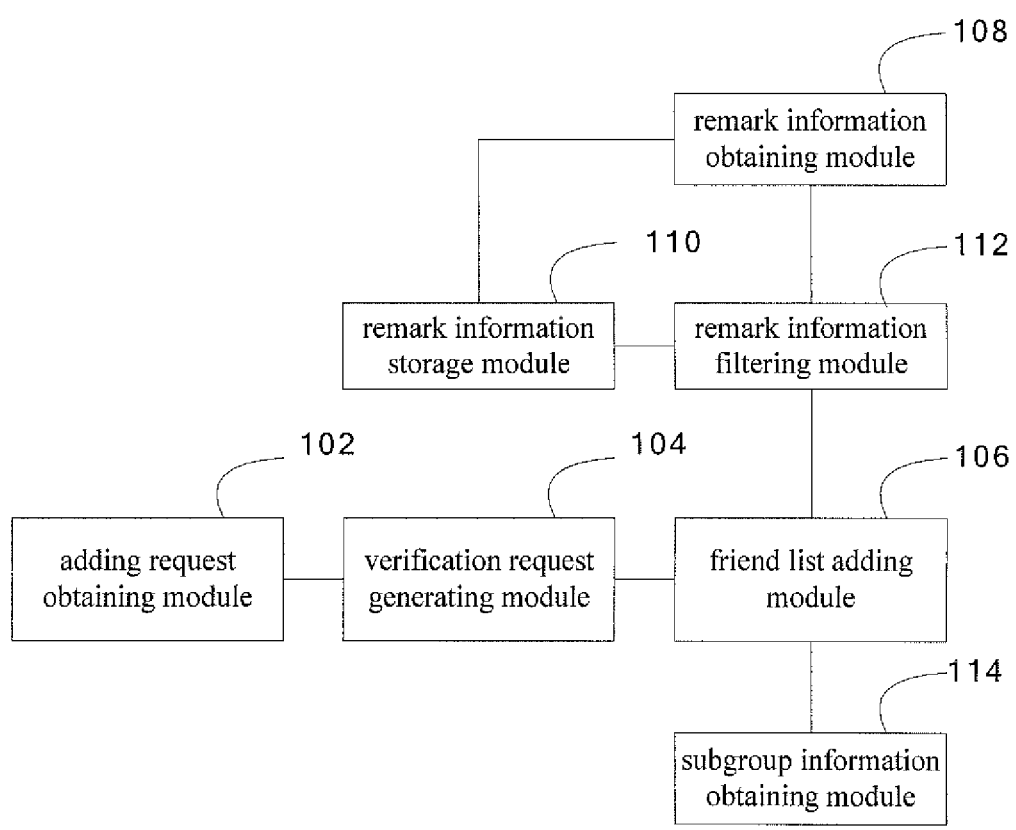
FIG. 3 is a schematic diagram illustrating a structure of a device for adding a friend in social network according to another embodiment.

In one embodiment, as illustrated in FIG. 3, the device for adding a friend in social network further includes a remark information obtaining module 108 configured to obtain a second remark information corresponding to the second user identification before adding the second user to the friend list of the first user, and the second remark information is set by the users in the group.

Furthermore, the obtained second remark information may be multiple. As illustrated in FIG. 3, the device for adding a friend in a social network further includes a remark information filtering module 112 configured to filter the second remark information. The filtered second remark information is remark information of same content and with the largest count number.

After the friend adding confirmation request corresponding to the second user identification is obtained, the first user is informed by email or instant message, and the second remark information is sent to a terminal corresponding to the first identification. The terminal may present an adding success prompt box to the first user, and the second remark information may be presented through the editable input box. In this embodiment, the device for adding a friend in a social network further includes a remark information storage module 110. The remark information storage module 110 may be configured to store the second remark information after obtaining the confirmation instruction.

In another embodiment, the terminal corresponding to the first user identification may present a plurality of the second remark information simultaneously via the editable drop-down box. The input remark information may be obtained and stored by drop-down selection operation or keyboard input operation.

In this embodiment, an interface can be provided for the user for setting the remark information himself. The user may select appropriate remark information in the second remark information; if the user is not satisfied with the automatically generated second remark information, he/she may input the remark information by himself/herself, facilitating the user's operation.

In one embodiment, as illustrated in FIG. 3, the device for adding a friend in a social network further includes a subgroup information obtaining module 114 configured to obtain subgroup information of the user identification of a group friend in the group in the friend list corresponding to the first user identification. The friend list adding module 106 may be further configured to add the second user identification to a corresponding subgroup in the friend list corresponding to the first user identification according to the subgroup information.

In the social network, in order to allow the user to manage friends, subgroups are created in the friend list. For example, a classmate subgroup, a colleague subgroup, a travel enthusiast subgroup, etc. The user can classify his friends into corresponding subgroups to facilitate searching.

In one embodiment, the friend list adding module 106 may be further configured to extract a subgroup containing the largest number of user identifications in the group from the subgroup information and add the second user identification to the subgroup.

For example, if the majority of the user identification of group friends is in a "classmate" subgroup in the friend list corresponding to the first user identification, then the friend list adding module 106 may be configured to add the second user identification into the "classmate" subgroup.

The method, device, and storage media for adding a friend in social network obtain a group where the first user identification and the second user identification are included, and generate the verification request according to information corresponding to the first user identification, and then send the verification request to a terminal corresponding to the second user identification. Since the user does not need to manually enter the verification information to generate the verification request, which reduces a step of manually entering text, the user only need to click on a mouse several times to complete adding a friend, thereby improving operation convenience during adding a friend.

In addition, by obtaining and storing the second remark information added to the second user identification by group friends in the group, the remark information of the second user marked by the first user may be automatically generated according to the remark information of the second user identification marked by a majority of group friends (the user corresponding to the user identification of group friends). This eliminates the step of manually entering remarks during adding a friend (automatically complete). Therefore, the operation is more convenient, thereby improving the ease of operation.

In addition, the step of obtaining the subgroup information in the friend list corresponding to the first user identification marked by the group friend user, adding the second user identification to corresponding group in the friend list corresponding to the first user identification, and the step of manually grouping during adding a friend (automatically) are eliminated, thereby making the operation more simple and convenient.

Furthermore, the present disclosure also provides a computer-readable storage medium storing a computer executable instructions. The computer executable instructions are executed by at least one processor included in an electronic device, such as a computer, a mobile phone, etc. When the computer executable instructions are executed, a recommended method for downloading a resource is performed. A person skilled in the art will understand that the performance of all or part of the process of the method in the embodiments can be achieved by a computer program to instruct relevant hardware. The computer program may be stored in a computer-readable storage medium, and when the computer program is implemented, it may include the processes described in the embodiments of the method. Wherein the storage medium may be a magnetic disk, optical disk, read only memory (ROM), or random access memory (RAM) and so on.

Although the invention herein has been described with reference to several embodiments, it is to be understood that the embodiments are merely illustrative of the principles and applications of the present invention. It is therefore to be understood that a number of variations and modifications may be made to the illustrative embodiments without departing from the inventive concept or scope of the present disclosure. Accordingly, the protection scope of the present disclosure is subject to the appended claims.

The invention claimed is:

1. A method for adding a friend in a social network performed by a processor controlled by executable machine readable instructions provided on a non-transitory computer-readable storage medium, comprising:
    obtaining by the processor a friend adding request from a first user identification, wherein the friend adding request includes a second user identification selected by the first user identification from a group to be added to a friend list of the first user identification, and wherein the first user identification and the second user identification are participants of the group for exchanging group communication, but not on each other's friend list;
    automatically generating by the processor a verification request including (1) a first alias of the first user identification that is selected from one or more a plurality of aliases of the first user identification that are respectively chosen for the first user identification by other user identifications excluding the first user identification of the group on their respective friend lists and (2) a group name of the group;
    sending by the processor the verification request to a terminal corresponding to the second user identification;
    obtaining a friend adding confirmation request in response to the verification request from the second user identification;
    obtaining by the processor a plurality of aliases of the second user identification that are set by other user identifications excluding the second user identification of the group on their respective friend lists;
    sending the plurality of aliases of the second user identification to a terminal corresponding to the first user identification for a user selection of a second alias of the second user identification by the first user identification; and
    adding by the processor the second alias of the second user identification to the friend list of the first user identification and storing the second alias of the second user identification.

2. The method of claim 1, wherein the first alias of the first user identification comprises at least a user name corresponding to the first user identification; and
    wherein the first alias of the first user identification is obtained by at least one selected from the group consisting of:
        obtaining by the processor the first alias of the first user identification according to user data corresponding to the first user identification; and
        obtaining by the processor the first alias of the first user identification according to group card information of a first user corresponding to the first user identification in the group.

3. The method of claim 1, wherein adding the second user identification to a friend list of the first user identification further comprises:
    obtaining by the processor subgroup information of a user identification in the group in the friend list of the first user identification; and
    adding by the processor the second user identification to a corresponding subgroup in the friend list of the first user identification according to the subgroup information.

4. The method of claim 3, wherein adding the second user identification to a corresponding subgroup in the friend list of the first user identification according to the subgroup information comprises:
    extracting by the processor a subgroup containing the largest number of user identifications, and
    adding by the processor the second user identification to the subgroup containing the largest number of user identifications.

5. The method of claim 1, wherein generating the verification request comprises:

generating by the processor verification information according to the plurality of aliases of the first user identification, and returning the verification information to a terminal corresponding to the first user identification;

obtaining by the processor a selection of the verification information; and generating by the processor the verification request according to the selection of the verification information.

6. The method of claim 5, wherein generating the verification information comprises:

determining by the processor whether an alias of the one or more aliases of the first user identification is obtained;

if yes, generating by the processor the verification information according to the obtained alias of the one or more aliases of the first user identification; and otherwise, generating by the processor the verification information according to user data corresponding to the first user identification.

7. A device for adding a friend in a social network, wherein the device comprises:

a processor;

a non-transitory computer-readable storage medium; and a plurality of executable instructions stored in the non-transitory computer-readable storage medium, wherein the processor is configured to execute the plurality of executable instructions to cause the device to:

obtain by the processor a friend adding request from a first user identification, wherein the friend adding request includes a second user identification selected by the first user identification from a group to be added to a friend list of the first user identification, and wherein the first user identification and the second user identification are participants of the group for exchanging group communication, but not on each other's friend list;

automatically generate by the processor a verification request including (1) a first alias of the first user identification that is selected from a plurality of aliases of the first user identification that are respectively chosen for the first user identification by other user identifications excluding the first user identification of the group on their respective friend lists and (2) a group name of the group;

send by the processor the verification request to a terminal corresponding to the second user identification;

obtain a friend adding confirmation request in response to the verification request from the second user identification;

obtain by the processor a plurality of aliases of the second user identification that are set by other user identifications excluding the second user identification of the group on their respective friend lists;

send the plurality of aliases of the second user identification to a terminal corresponding to the first user identification for a user selection of a second alias of the second user identification by the first user identification; and add by the processor the second alias of the second user identification to the friend list of the first user identification and store the second alias of the second user identification.

8. The device of claim 7, wherein the first alias of the first user identification comprises at least a user name corresponding to the first user identification; and wherein the first alias of the first user identification is obtained by at least one selected from the group consisting of:

obtaining by the processor the first alias of the first user identification according to user data corresponding the first user identification; and obtaining by the processor the first alias of the first user identification according to group card information of a first user corresponding to the first user identification in the group.

9. The device of claim 7, wherein adding the second user identification to a friend list of the first user identification further comprises:

obtaining by the processor subgroup information of a user identification in the group in the friend list of the first user identification;

adding by the processor the second user identification to a corresponding subgroup in the friend list of the first user identification according to the subgroup information.

10. The device of claim 9, wherein adding the second user identification to a corresponding subgroup in the friend list of the first user identification according to the subgroup information comprises:

extracting by the processor a subgroup containing the largest number of user identifications, and adding by the processor the second user identification to the subgroup containing the largest number of user identifications.

11. The device of claim 7, wherein generating the verification request comprises:

generating by the processor verification information according to the plurality of aliases of the first user identification and return by the processor the verification information to a terminal corresponding to the first user identification;

obtaining by the processor a selection of the verification information; and generating by the processor the verification request according to the selection of the verification information.

12. The device of claim 11, wherein generating the verification information comprises:

determining by the processor whether an alias of the one or more aliases of the first user identification is obtained;

if yes, generating by the processor the verification information according to the obtained alias of the one or more aliases of the first user identification; and otherwise, generating by the processor the verification information according to user data corresponding to the first user identification.

13. A non-transitory computer-readable storage medium storing a computer executable program to execute a method by a processor for adding a friend in social network, wherein the method comprises:

obtaining by the processor executing the program a friend adding request from a first user identification, wherein the friend adding request includes a second user identification selected by the first user identification from a group to be added to a friend list of the first user identification, and wherein the first user identification and the second user identification are participants of the group for exchanging group communication, but not on each other's friend list;

automatically generating by the processor executing the program a verification request including (1) a first alias of the first user identification that is selected from a plurality of aliases of the first user identification that are respectively chosen for the first user identification by other user identifications excluding the first user identification of the group on their respective friend lists and (2) a group name of the group;

sending by the processor executing the program the verification request to a terminal corresponding to the second user identification;

obtaining a friend adding confirmation request in response to the verification request from the second user identification;

obtaining by the processor a plurality of aliases of the second user identification that are set by other user identifications excluding the second user identification of the group on their respective friend lists;

sending the plurality of aliases of the second user identification to a terminal corresponding to the first user identification for a user selection of a second alias of the second user identification by the first user identification; and adding by the processor the second alias of the second user identification to the friend list of the first user identification and storing the second alias of the second user identification.

14. The non-transitory computer-readable storage medium of claim 13, wherein the first alias of the first user identification comprises at least a user name corresponding to the first user identification; and wherein the first alias of the first user identification is obtained by at least one selected from the group consisting of:

obtaining by the processor executing the program the first alias of the first user identification according to user data corresponding to the first user identification;

obtaining by the processor executing the program the first alias of the first user identification according to group card information of a first user corresponding to the first user identification in the group.

15. The non-transitory computer-readable storage medium of claim 13, wherein adding the second user identification to a friend list of the first user identification further comprises:

obtaining by the processor subgroup information of a user identification in the group in the friend list of the first user identification; and adding by the processor the second user identification to a corresponding subgroup in the friend list of the first user identification according to the subgroup information.

16. The non-transitory computer-readable storage medium of claim 15, wherein adding the second user identification to a friend list of the first user identification further comprises:

extracting by the processor a subgroup containing the largest number of user identifications, and adding by the processor the second user identification to the subgroup containing the largest number of user identifications.

17. The non-transitory computer-readable storage medium of claim 13, wherein generating the verification request comprises:

generating by the processor verification information according to the plurality of aliases of the first user identification, and returning the verification information to a terminal corresponding to the first user identification;

obtaining by the processor a selection of the verification information; and generating by the processor the verification request according to the selection of the verification information.

18. The non-transitory computer-readable storage medium of claim 17, wherein generating the verification request comprises:

determining by the processor whether an alias of the one or more aliases of the first user identification is obtained;

if yes, generating by the processor the verification information according to the obtained alias of the one or more aliases of the first user identification; and otherwise, generating by the processor the verification information according to user data corresponding to the first user identification.

* * * * *